United States Patent [19]
Elmore et al.

[11] Patent Number: 5,227,453
[45] Date of Patent: Jul. 13, 1993

[54] VERNONIA OIL MODIFICATION OF EPOXY RESINS

[75] Inventors: Jim D. Elmore; William J. DeGooyer, both of Louisville; Mary B. Tipton, Bardstown; John H. Kaiser, Louisville, all of Ky.

[73] Assignee: Hi-Tek Polymers, Inc., Jeffersontown, Ky.

[21] Appl. No.: 832,992

[22] Filed: Feb. 10, 1992

[51] Int. Cl.$^5$ ............................................... C08G 59/00
[52] U.S. Cl. ..................................... 528/104; 528/103; 528/111.5; 528/112
[58] Field of Search ...................... 528/103, 104, 111.5, 528/112

[56] References Cited

U.S. PATENT DOCUMENTS

| | | | |
|---|---|---|---|
| 4,040,994 | 8/1977 | Lewis et al. | 528/103 |
| 4,474,941 | 10/1984 | Wilk et al. | 528/297 |
| 4,962,179 | 10/1990 | Corley | 528/103 |
| 5,095,050 | 3/1992 | Treybig et al. | 528/103 |

Primary Examiner—Melvyn I. Marquis
Assistant Examiner—Randy Gulakowski
Attorney, Agent, or Firm—Herbert P. Price

[57] ABSTRACT

High solids coating compositions are made from organic solvent solutions of the reaction product of a diglycidyl ether of a dihydric phenol, vernonia oil and a dihydric phenol.

18 Claims, No Drawings

VERNONIA OIL MODIFICATION OF EPOXY RESINS

BACKGROUND OF THE INVENTION

The field of art to which this invention is directed is epoxy resin coating compositions.

The basic epoxy resin composition is the diglycidyl ether of a dihydric phenol, the most important of which from a commercial viewpoint is the diglycidyl ether of p,p'-dihydroxydiphenyl propane (Bisphenol A). Such diglycidyl ethers can be converted into thermoset compositions by a wide variety of curing agents, or can be converted into higher molecular weight epoxy resins by reaction with additional dihydric phenol. These higher molecular weight epoxy resins are used primarily in solution coatings wherein they are crosslinked with various crosslinking agents, e.g., aminoplast resins, polyisocyanates or polyamines, or are reacted with unsaturated fatty acids to form epoxy esters.

In addition to modification with dihydric phenols and unsaturated fatty acids, epoxy resins have been modified either by reaction or by blending with a variety of compounds.

Blends of polyglycidyl ethers of polyhydric phenols with epoxidized fatty acid esters, e.g., epoxidized linseed oil, are described in U.S. Pat. No. 2,628,514.

Adhesive compositions made from blends of liquid polyglycidylethers of dihydric phenols, solid polyglycidyl ethers of dihydric phenols and epoxidized fatty acid esters are described in U.S. Pat. No. 2,682,515.

In U.S. Pat. No. 2,944,035, epoxidized fatty acid esters are reacted with mono or polyhydric phenols in such amounts that some of the epoxy groups remain unreacted. The resulting composition is then crosslinked with various crosslinking agents.

U.S. Pat. No. 4,119,640 discloses polymerizable reaction product mixtures made by reacting an epoxidized fatty acid ester with a mixture of acrylic acid, a diepoxide and a modifying compound.

U.S. Pat. No. 4,419,467 describes higher molecular weight epoxy resins made by reacting lower molecular weight epoxy resins with polyether polyols.

In U.S. Pat. No. 4,980,397, higher molecular weight epoxy resins are made by coreacting aliphatic diepoxides, glycidyl ethers of dihydric phenols and dihydric phenols.

Manufacturers of paints and coatings are under increasing government pressure to reduce volatile organic compounds (VOC's) contained in their coating formulations. There is a need for resin systems which can be used to form high solids solutions at viscosities suitable for use in coating formulations.

SUMMARY OF THE INVENTION

This invention is directed to modified epoxy resin compositions which can be used to make high solids content organic solvent solutions useful in coating formulations.

The composition of this invention is the reaction product of a diglycidyl ether of a dihydric phenol, vernonia oil, and a dihydric phenol, wherein the three components are employed in such amounts that about 1.2 to about 1.5 of the epoxy groups of the diglycidyl ether of the dihydric phenol and of the vernonia oil are reacted per each phenolic group of the dihydric phenol, and the vernonia oil is employed in the amount of about 15 to about 35 weight percent based on the weight of the three components.

Organic solvent solutions of the compositions of this invention can be used to form thermoset coatings when cured with polyamines, polyamidoamines, aminoplast resins, phenolplast resins, and polyisocyanates.

The compositions of this invention can be modified by esterification with unsaturated fatty acids and with alkylacetoacetate to form air drying and heat curable coating compositions.

DESCRIPTION OF THE INVENTION

Vernonia oil used in this invention is obtained from the seeds of *Vernonia galamensis*, a plant grown in Africa, Asia, Central America and the southwest U.S.A. Vernonia oil is predominantly trivernolin, a triglyceride of vernolic acid. Vernonia oil is a naturally occurring epoxidized vegetable oil containing one epoxy ring and one carbon—carbon double bond per each vernolic acid residue. Vernonia oil is a low viscosity liquid having a melting point of about 36° F.

Vernonia oil has a homogeneous molecular structure consisting predominantly of identical triglyceride molecules which have three equal vernolic acid residues. In contrast, all other vegetable oils consist of a heterogeneous mixture of triglycerides with different fatty acid residues.

Vernonia oil has an epoxide equivalent weight of 390-460 and contains an average of about 2.5 epoxy groups per molecule.

The diglycidyl ether of the dihydric phenol used in this invention has an epoxide equivalent weight of about 170 to about 250, and preferably about 180 to about 200. Such diglycidyl ethers are made by reacting epichlorohydrin and a dihydric phenol with caustic. Examples of dihydric phenols are resorcinol, dihydroxybiphenyl, dihydroxydiphenyl methane, p,p'-dihydroxydiphenyl propane, or Bisphenol A as it is generally called, dihydroxydiphenyl sulfone, dihydroxydiphenyl carbonate, and the like. The preferred dihydric phenol is p,p'-dihydroxydiphenyl propane.

The dihydric phenols which are reacted with the vernonia oil and the diglycidyl ether are the same dihydric phenols which are listed hereinabove. The preferred dihydric phenol is p,p'-dihydroxydiphenyl propane.

The diglycidyl ether of the dihydric phenol, the vernonia oil and the dihydric phenol are reacted together in what is referred to in the art as the advancement process wherein the phenolic hydroxyl groups are reacted with epoxy groups to form higher molecular weight resins.

The upgrade catalysts used in this invention are the phosphonium salts described in U.S. Pat. Nos. 3,477,990, 3,948,855, 4,132,706 and 4,395,574, which are hereby incorporated by reference. These phosphonium salts can be represented by the formula:

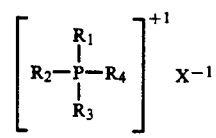

wherein $R_1$, $R_2$, $R_3$ and $R_4$ are the same or different and represent hydrocarbon residues which may or may not be substituted with one or more groups such as halogen atoms or the nitrate group. The hydrocarbon residues can be aliphatic hydrocarbon radicals containing one to about 20 carbon atoms, aromatic hydrocarbon radicals and alkyl substituted aromatic hydrocarbon radicals. X is a halide or the anion portion of an acid, ester or acid-ester of an element selected from carbon and phosphorous. Examples of such acids, esters, or acid-esters are carbonic acid, acetic acid, propionic acid, diethyl phosphate and the like. Preferred catalysts are those wherein one R is an alkyl group and the remaining R's are aromatic groups and wherein the anion is derived from an organic acid. A particularly preferred catalyst is ethyltriphenylphosphonium acetate.

The upgrade catalysts are used in the amount of about 0.05 to about 0.1 weight percent based on the total weight of the reactants.

The upgrade reaction can be conducted by adding all of the components together and heating until the desired extent of reaction is obtained as determined by epoxide equivalent weight. Preferably the reaction is conducted by adding the vernonia oil, dihydric phenol and catalyst, heating with stirring until the dihydric phenol dissolves and then adding the diglycidyl ether of the dihydric phenol. The reaction is conducted at a temperature of about 350° F. to about 450° F., preferably about 390°–410° F., until the phenolic hydroxyls are etherified as determined by the calculated increase in epoxide equivalent weight. Generally the time required for the reaction will be about 2 to about 4 hours.

As stated hereinbefore, vernonia oil contains an average of 2.5 epoxy groups per molecule. In order to reduce branching to lower viscosity in the reaction of vernonia oil and the dihydric phenol, it is sometimes desirable to prereact the vernonia oil with a monohydric phenol or a monocarboxylic acid or to include a monohydric phenol or a monocarboxylic acid in the upgrade reaction. Suitable monohydric phenols are phenol and alkyl phenols wherein the alkyl group contains 1 to 9 carbon atoms. A preferred monohydric phenol is cresol. Suitable monocarboxylic acids are those which contain 7 to about 22 carbon atoms. Preferred monocarboxylic acids are aromatic acids or alicyclic acids, e.g., benzoic acid or abietic acid. Gum rosin can also be used as the acidic component. The monohydric phenol or the monocarboxylic acid is used in the amount of 0.1 up to about 1 mole per 5 epoxy equivalents of the vernonia oil.

It has been found that the use of aluminum complexes with salicylic acid as cocatalysts with the phosphonium salt increases the reactivity rate of the epoxy groups in the vernonia oil. The aluminum complexes contain aluminum chelated with salicylic acid and further complexed with alkanols containing one to six carbon atoms and alkanoic acids containing two to ten carbon atoms. Preferably, the aluminum complex will contain 6 aluminum atoms complexed with one mole of salicylic acid, about 2 moles of isopropanol and about 2 moles of 2-ethyl-hexanoic acid. The aluminum complex is used in the amount of about 0.05 to about 0.1 weight percent based on the total weight of the reactants.

In order to prevent color formation during the upgrade reaction, phosphite antioxidants can be utilized. Suitable phosphites are the alkyl-aryl phosphites, such as diphenyl isodecyl phosphite, phenyl diisodecyl phosphite, and the like. A particularly preferred phosphite antioxidant is poly 4,4'-isopropylidenediphenol mixed $C_{12}$ to $C_{15}$ alcohol phosphite. The antioxidants are used in amounts up to about 1 weight percent based on the total reactants' weight, preferably about 0.5 to about 1 weight percent.

It is advantageous to conduct the upgrade reaction under a vacuum of about 1 to about 5 cm. The use of vacuum prevents the development of haze in the product.

Organic solvent solutions of the upgrade products which have epoxide equivalent weights of about 1,000 to about 2,000 can be formulated into high solids coating compositions which are curable using conventional epoxy resin curing agents, such as polyamines, polyamidoamines, polyisocyanates, aminoplast resins and phenolplast resins.

The upgrade products are particularly useful when converted to epoxy esters, i.e., when esterified with unsaturated fatty acids. The unsaturated fatty acids are those acids derived from unsaturated vegetable oils—drying oils. Such acids which are named for the oils from which they are derived are linseed fatty acids, soybean fatty acids, tall oil fatty acids, tung oil fatty acids, dehydrated castor oil fatty acids, and the like. A preferred fatty acid is linseed.

The reaction of the upgrade epoxy resin and the unsaturated fatty acid is conducted at a temperature of about 380° F. to about 410° F. until the acid value of the reaction mixture is reduced below 10, preferably below 5. Such reaction requires about 4 to about 8 hours.

The amount of unsaturated fatty acid used in preparing the epoxy esters is about 10 to about 40 weight percent, preferably about 15 to about 25 weight percent, based on the weight of the resulting epoxy ester.

A particularly preferred epoxy ester is one which is further modified by ester interchange with an alkyl acetoacetate wherein the alkyl group contains 1 to 8 carbon atoms. Preferred alkylacetoacetates are those wherein the alkyl group contains 2 to 4 carbon atoms, with tertiary butyl-acetoacetate being most preferred. The acetoacetate modification is conducted by heating the epoxy ester with about 3 to about 10 weight percent alkyl acetoacetate wherein said weight percent is based on the weight of the epoxy ester. Heating is conducted at about 240° to about 340° F. until the calculated amount of alcohol is recovered by distillation from the reactants, generally about 1 to about 3 hours.

In formulating coating compositions, the advanced resins and the epoxy esters are dissolved in non-protic solvents, i.e., esters, ketones, aliphatic hydrocarbons, aromatic hydrocarbons and mixtures thereof. Examples of such solvents are butyl acetate, methylpropyl ketone, methylamyl ketone, xylene, mineral spirits and the like. Solutions can be made having Gardner-Holdt viscosities at 25° C. of U at 70 percent solids and $Z_5$ at 90 percent solids.

The compositions of this invention can be used wherever advanced epoxy resins and epoxy esters are used. Such uses are well known to those skilled in the art.

The epoxy esters of this invention are particularly useful in the formulation of high solids air-dry or low-bake coatings. In formulating the coatings, any of the well known driers can be used to enhance the cure. A particularly useful drier package is one which contains cobalt driers in combination with cerium IV driers and aluminum acetoacetate complexes. Examples of these driers are cobalt naphthenate, cerium (IV) 2-ethylhexanoate and an aluminum acetoacetate complex represented by the formula:

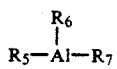

wherein $R_5$ is a chelate group containing the acetoacetoxy moiety and $R_6$ and $R_7$ are the same or different and are either an alkoxide group or an acetoacetoxy group.

The alkoxide group contains 2 to about 8 carbon atoms with the preferred group being the isopropoxide group. The chelate group can be represented by the formula:

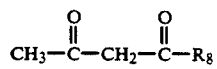

wherein $R_8$ is derived from a 2 to 4 carbon alcohol or a hydroxyalkyl ester of a polymerizable acid wherein the alkyl group contains 2 to 4 carbon atoms. Preferred chelating compounds are ethylacetoacetate and acetoacetoxyethyl methacrylate. Preferably, the aluminum complex contains one isopropoxide group, one ethylacetoacetate chelate group and one acetoacetoxyethyl methacrylate chelate group.

These driers are used in the following amounts wherein said amount is expressed as weight percent metal based on 100 parts by weight of resin:
Cobalt—about 0.015 to about 0.06 weight percent
Cerium (IV)—about 0.1 to about 0.4 weight percent
Aluminum—about 0.02 to about 0.08 weight percent
The preferred amount of each of these driers is:
Cobalt—0.03 weight percent; cerium (IV)—0.2 weight percent; aluminum—0.04 weight percent.

The coating compositions can contain other components, such as pigments, flow control agents, anti-skin agents, and the like, such components being well known to those skilled in the art.

The following examples describe the invention in greater detail. Parts and percentages, unless otherwise indicated are parts and percentages by weight.

EXAMPLE 1

To a suitable reactor were added 150 parts of vernonia oil, 223 parts of the diglycidyl ether of Bisphenol A having an epoxide equivalent weight of 190, 127 parts of Bisphenol A, 5 parts of phosphite antioxidants (poly 4,4'-isopropylidene-diphenol mixed $C_{12}$–$C_{15}$ alcohol phosphite) and 0.38 part of ethyl triphenylphosphonium acetate. Heat, agitation and nitrogen sparge were applied. The temperature was raised to 390° F. and was held at this temperature for 3 hours and 28 minutes, the epoxide equivalent weight of the reaction mass being 1069. Linseed fatty acids, 125 parts, were then added and the temperature was adjusted to 385° F. Forty-one minutes after adding the fatty acids, 0.625 part of a solution of aluminum complex (6 aluminum atoms complexed with one mole of salicylic acid, about 2 moles of isopropanol and about 2 moles of 2-ethyl-hexanoic acid wherein the solution contained 24 percent aluminum complex, 10 percent isopropyl 2-ethyl hexanoate and 66 percent methyl isobutyl ketone). After heating at 375°–385° F. for 49 minutes, the temperature was raised to 450° F. After one hour at 450° F., the acid value of the reactants was 4.0. The reactor was fitted with an azeotropic distillation trap and the trap was filled with xylene. The temperature was raised to 525° F. and was held at 525°–535° F. for about 17 minutes. The acid value was found to be 3.0. The trap contents, 0.6 parts water, 0.4 parts oil and the remainder of xylene was drained and set aside. The temperature was lowered to 390° F. and 57.1 parts of t-butylacetoacetate were added over 1 hour with the temperature dropping to 350° F. The temperature was raised to 375° F. while distilling off t-butanol. After 15 minutes at 370°–375° F., about 20 parts of t-butanol were distilled over. Methyl propyl ketone, 253.5 parts, was added to reduce the solids to 70 percent. The viscosity at 70 percent solids was X-Y, Gardner-Holdt at 25° C.

To 20 parts of the epoxy ester solution were added 3.89 parts of ethyl-3-ethoxy propionate, 9 parts of propylene glycol monomethyl ether acetate, 0.06 part of antiskinning agent, 0.08 part of cobalt naphthenate containing 6 percent cobalt (54 percent solids in odorless mineral spirits), 0.04 part of cerium IV octoate containing 18 percent cerium (36 percent solids in 2-ethylhexanoic acid) and 0.15 part of aluminum chelate complex containing 3.81 percent aluminum. The aluminum complex contained one atom of aluminum, one isopropoxide moiety, one ethylacetoacetate moiety and one acetoacetoxyethyl methacrylate moiety at 60 percent solids in mineral spirits. The resulting epoxy ester coating composition had a NV content of 43.6 percent and a viscosity of D-E, Gardner-Holdt at 25° C. After 2 hours, it was F-G. After 26 hours the viscosity was g-H. After 3 days, it was H-I. After about 2 months, it was H.

Drawdowns were made with the epoxy ester solution on glass panels at 3 mil wet thickness. After 20 hours at room temperature, the pencil hardness was 2B-B, and the methyl ethyl ketone (MEK) resistance was 8 double rubs.

Drawdowns were heated at 110° C. for 30 minutes. The pencil hardness was F, and the MEK double rubs were 30. After 1 month at room temperature, the pencil hardness was H and the MEK resistance was 65 double rubs.

EXAMPLE 2

To a suitable reactor were added 270 parts of vernonia oil, 476.7 parts of the diglycidyl ether of Bisphenol A having an epoxide equivalent weight of 190, 253.3 parts of Bisphenol A, and 10 parts of the phosphite ester antioxidant described in Example 1. Agitation and nitrogen sparging were begun, a vacuum of 5 cm Hg was applied, and heating was begun. After 35 minutes, the temperature was 240° F. and the Bisphenol A was dissolved. The aluminum salicylate described in Example 1, 0.5 part, and 0.5 part of ethyltriphenyl phosphonium acetate were added. Vacuum was reduced to 2 cm Hg and heat was applied raising the temperature to 400° F. After heating for about 3 hours at 400° F., the epoxide equivalent weight of the reaction mixture was 1,025. Vacuum was turned off, and heating was discontinued. Ethyl-3-ethyoxy propionate, 68 parts, was added, the temperature was adjusted to 400° F. and 250 parts of linseed fatty acids were added. Heating at 400° F. was continued until the acid value was 3.0 at a time of 6 hours. Heating was discontinued, while 177.6 parts of t-butylacetoacetate were added over a six minute period. Heat was reapplied, raising the temperature to 240° F., at which point, t-butanol began to distill. The temperature slowly rose to 400° F. over a period of 3 hours with 58.1 parts of t-butanol being distilled off. Heating was discontinued, and 588 parts of propylene glycol monomethyl ether acetate and 56.1 parts of t-butanol were added, reducing the solids content to 68.5 percent.

The viscosity of the solution was V-W, Gardner-Holdt at 25° C..

A clear coating composition was made with 20 parts of the epoxy ester solution, 10 parts of propylene glycol monomethyl ether acetate, 0.15 part of the aluminum chelate complex solution described in Example 1, 0.05 part of the cobalt naphthenate solution described in Example 1, and 0.05 part of the cerium (IV) octoate solution described in Example 1. The NV content was 50.0 percent and the viscosity of the coating composition was D-E, Gardner-Holdt at 25° C. After 16.5 hours at room temperature, the viscosity was F-G.

Thirty hours later, the viscosity was G-H. After 5 months, the viscosity was still G-H.

Drawdowns were made on glass panels using a 3 mil Bird applicator. The films were tack free in 45 minutes, print free in less than 4 hours and tape free in less than 4 hours. After 2 weeks, the pencil hardness was HB and the solvent resistance was 90 double-rubs (MEK).

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. An epoxy resin composition consisting essentially of the reaction product of (a) a diglycidyl ether of a dihydric phenol, (b) vernonia oil, and (c) a dihydric phenol wherein (a), (b) and (c) are employed in such amounts that about 1.2 to about 1.5 epoxy groups of (A) and (B) are present for each phenolic groups of (C), and wherein the vernonia oil is present in the amount of about 15 to about 35 weight percent based on the weight of (A), (B), and (C).

2. The composition of claim 1 wherein the diglycidyl ether of the dihydric phenol has an epoxide equivalent weight of about 170 to about 250.

3. The composition of claim 2 wherein the epoxide equivalent weight is about 180 to about 200.

4. The composition of claim 1 wherein the diglycidyl ether of the dihydric phenol is the diglycidyl ether of p,p'-dihydroxy diphenyl propane and the dihydric phenol is p,p'-dihydroxydiphenyl propane.

5. The composition of claim 1 wherein the vernonia oil prior to reaction with the dihydric phenol and the diglycidyl ether is reacted with a monohydric phenol in the amount of about 0.1 to about 1 phenolic hydroxyl group per 5 epoxy equivalents of the vernonia oil.

6. The composition of claim 5 wherein the monohydric phenol is cresol.

7. The composition of claim 1 which is modified by esterification with an unsaturated fatty acid in the amount of about 10 to about 40 weight percent based on the weight of the composition of claim 1 and the weight of the fatty acid.

8. The composition of claim 7 wherein the unsaturated fatty acid is linseed fatty acid.

9. The composition of claim 7 wherein the unsaturated fatty acid is present in the amount of 15 to about 25 weight percent.

10. An epoxy resin composition comprising the reaction product of (A) a diglycidyl ether of a dihydric phenol, (B) vernonia oil and (C) a dihydric phenol wherein (A), (B), and (C) are employed in such amounts that about 1.2 to about 1.5 epoxy groups of (A) and (B) are present for each phenolic group of (C), and wherein the vernonia oil prior to reaction with the dihydric phenol and the diglycidyl ether is reacted with a monocarboxylic acid in the amount of about 0.1 to about 1 carboxylic acid group per 5 epoxy equivalents of the vernonia oil.

11. The composition of claim 10 wherein the monocarboxylic acid is benzoic acid.

12. The composition of claim 10 wherein the monocarboxylic acid is abietic acid.

13. An epoxy resin composition comprising the reacting product of (A) a diglycidyl ether of a dihydric phenol, (B) vernonia oil and (C) a dihydric phenol wherein (A), (B) and (C) are employed in such amounts that about 1.2 to about 1.5 epoxy groups of (A) and (B) are present for each phenolic group of (C), wherein said reaction product is modified by esterification with an unsaturated fatty acid in the amount of about 10 to about 40 weight percent based on the weight of said reaction product and the weight of the fatty acid and wherein the esterification product of said reaction product and the fatty acid is further modified with alkylacetoacetate wherein the alkyl group contains 1 to 10 carbon atoms.

14. The composition of claim 13 wherein the alkylacetoacetate is reacted in the amount of about 3 to about 10 weight percent based on the total weight of the esterification product and the alkylacetoacetate.

15. The composition of claim 13 wherein the alkylacetoacetate is t-butylacetoacetate.

16. The composition of claim 14 which contains cobalt driers in combination with cerium (IV) driers and aluminum acetoacetate complexes.

17. The composition of claim 14 wherein the cobalt drier is cobalt naphthenate, the cerium drier is cerium (IV) 2-ethylhexanoate and the aluminum acetoacetate complex is represented by the formula

wherein $R_5$ is a chelate group containing the acetoacetoxy moiety and $R_6$ and $R_7$ are the same or different and are either an alkoxide group or an acetoacetoxy group.

18. The composition of claim 16 wherein the driers are present in the amount, expressed as weight percent metal based on 100 parts by weight of resin, of about 0.015 to about 0.06 weight percent cobalt, about 0.1 to about 0.4 weight percent cerium (IV), and about 0.02 to about 0.08 weight percent aluminum.

* * * * *